United States Patent [19]

Laichinger et al.

[11] Patent Number: 5,233,910
[45] Date of Patent: Aug. 10, 1993

[54] PRESSURE HOLDING VALVE

[75] Inventors: Martin Laichinger, Ebersbach; Martin Scheffel, Vaihingen-Enzweihingen, both of Fed. Rep. of Germany

[73] Assignee: Robert Bosch GmbH, Stuttgart, Fed. Rep. of Germany

[21] Appl. No.: 882,717

[22] Filed: May 14, 1992

[30] Foreign Application Priority Data

May 14, 1991 [DE] Fed. Rep. of Germany ....... 4115596
Mar. 12, 1992 [DE] Fed. Rep. of Germany ....... 4207803

[51] Int. Cl.$^5$ ..................... F15B 11/08; F15B 13/04
[52] U.S. Cl. ................................... 91/444; 91/448; 91/420; 91/31; 137/625.49
[58] Field of Search ............. 91/444, 426, 446, 454, 91/469, 508, 448, 420, 6, 19, 31, 445; 251/30.01, 63, 63.5, 210; 137/625.49

[56] References Cited

U.S. PATENT DOCUMENTS

| | | | |
|---|---|---|---|
| 3,795,178 | 3/1974 | Roche | 91/420 |
| 3,795,255 | 3/1974 | Malott et al. | 91/420 X |
| 3,809,201 | 5/1974 | Miyanishi et al. | 137/625.49 X |
| 4,172,582 | 10/1979 | Bobnar | 251/63 |
| 4,244,275 | 1/1981 | Smilges | 91/420 |
| 4,651,624 | 3/1987 | Beck . | |
| 4,727,792 | 3/1988 | Haussler | 91/420 |
| 4,779,647 | 10/1988 | Christian | 251/210 X |
| 4,811,649 | 3/1989 | Heusser | 91/444 X |

FOREIGN PATENT DOCUMENTS

176679 4/1986 European Pat. Off. .
3710863 10/1988 Fed. Rep. of Germany .

*Primary Examiner*—Edward K. Look
*Assistant Examiner*—Hoang Nguyen
*Attorney, Agent, or Firm*—Edwin E. Greigg; Ronald E. Greigg

[57] ABSTRACT

A pressure holding valve for pressure-fluid-actuated leveling systems in vehicles, having at least one seat valve with a valve opening, a valve seat and a valve member in which the valve member is opened by a control piston acted upon by pressure fluid. In order to achieve an absolutely pressure-tight seat valve with a long service life, an elastomer seal which seals off from the valve member is disposed on the valve seat, and pressure equalizing means are provided such that upon an impingement of pressure on the control piston in an opening direction of the seat valve, pressure build up upstream of the valve member is such that only a slight pressure difference arises at the seal at the onset of opening. In addition, the valve member is embodied such that upon displacement in a closing direction of the seat valve, the valve member substantially closes the valve opening in advance of the valve member becoming seated upon the seal.

28 Claims, 3 Drawing Sheets

Fig. 3

PRESSURE HOLDING VALVE

BACKGROUND OF THE INVENTION

The invention relates to a pressure holding valve, in particular for pressure-fluid-actuated leveling systems in vehicles.

A known pressure holding valve of this type is embodied as a so-called unblockable check valve (Götz and Lackmann, "Hydraulik in Theorie und Praxis" [Hydraulics in Theory and Practice], Robert Bosch GmbH, 1981, page 157, or European Patent Document 01 76 679 A1 or German Patent Document 37 10 863 A1). Such pressure holding valves are used wherever, in the position of repose, motion in the blocking direction of the work piston of a work cylinder connected to the work connection has to be avoided on the one hand, an example being the lowering of a load because of the occurrence of leaking oil, and on the other when motion in the previously blocked direction must be executed on command. The opening of the seat valve takes place by means of the control piston, which is acted upon with pressure fluid (liquid or compressed air) via the control line. Because of the sometimes quite major pressure differences and high flow velocities that arise at the valve seat upon opening and closing of the seat valve, the valve member and valve seat are exposed to heavy loads. The only material that can therefore be considered for sealing purposes is metal, preferably steel.

If such holding valves are used in hydraulic leveling systems of motor vehicles, it has been found that unavoidable leakage on the order of magnitude of from 0.5 to 1 cm$^3$/min, depending on the valve model, can arise at the seat valve. As a result, after being parked for a relatively long time, several hours, or days, the vehicle body drops down to the stop cushions on the frame, or onto the vehicle axles.

OBJECT AND SUMMARY OF THE INVENTION

The pressure holding valve according to the invention has an advantage over the prior art that durable tightness of the seat valve is attained by the seal between the valve seat and the valve member. Further essential characteristics of the invention cause the seat valve to be pressure-equalized both upon opening and upon closing, and there is no volumetric flow via the seal. When the seat valve is opened, but also as the seat valve is opening or closing, the seal is also located outside the flow range of maximum flow velocity. All of this contributes to the "protection" of the seal and assures a long service life of the pressure holding valve.

Since major flow velocities or pressure differences cannot occur at the valve seat during the opening and closing of the seat valve, it is in particular advantageously possible to use an elastic or elastomeric material for the seal, particularly a plastic sealing ring, for example. This has the advantage that over the long term, excellent static tightness is attainable.

To attain long-term durability, the present invention does not require providing a metal seal between the valve member and the valve seat or forming such a seal onto the valve member or valve seat. By using an elastic or elastomeric and in particular a soft-elastic seal, high static tightness is attained while manufacture is simple. The elastic or soft-elastic seal advantageously assures high static tightness and long durability in the present invention.

In a preferred embodiment of the invention, the pressure equalizing means are embodied in a simple manner by means of an equalizing line that connects the control line to the control piston with the valve chamber having the supply connection, and a check valve or throttle is disposed in this line. A shutoff device connected to the supply connection provides for the shutoff of the valve chamber, so that a pressure can build up there. In the terminal opening position of the seat valve, the equalization line is blocked off, that is, shut off, by suitable structural provisions on the control piston and in the valve chamber. Blocking off the equalization line advantageously prevents a continuous flow of hydraulic oil via the throttle or check valve into the valve chamber. If a throttle is inserted into the equalization line, then in a further feature of the invention, a further throttle should be provided in the control line, its throttle cross section being greater than that of the throttle in the equalization line. This prevents a collapse of the control pressure at the control piston upon opening of the pressure holding valve, in other words preventing it from dropping to the level of the actuator pressure, which would prevent actuation of the control piston.

If a check valve is inserted into the equalization line, then a throttle in the control line is not necessary. The check valve prevents such a pressure drop upon valve opening and also prevents the flow of leaking oil that would be unavoidable with a throttle.

If the control piston is axially displaceably guided in a control cylinder, and one control chamber (the forward control chamber) defined by it in the control cylinder communicates with the control line while the other, rear control chamber defined by it in the control cylinder communicates with the valve chamber of the seat valve carrying the supply connection, then the equalization line can simply be embodied as a through bore in the control piston, which includes the throttle or check valve, or by means of a line with a check valve or throttle leading from the control line to the rear control chamber.

In a further embodiment of the invention, the blocking off of the equalization line in the terminal opening position of the seat valve is done by providing that the control piston, on the piston face defining the rear control chamber, has a circular control edge that together with a further control edge, embodied in the rear control chamber, closes off the mouth of the equalization line in the rear control chamber in the terminal opening position of the seat valve.

In a preferred embodiment of the invention, the valve member of the seat valve is acted upon by a valve closing spring having an extremely low initial tension in the closing direction. This restoring spring on the one hand effects a constantly defined control piston position, and on the other it assures that at the instant the seat valve opens, the pressure in the control chamber is somewhat greater than the pressure in the second valve chamber having the work connection. Since the initial tension of the restoring spring essentially determines this pressure difference, it is kept quite low.

In a preferred embodiment of the invention, the valve member is embodied as a piston slide, which is seated by its end face on the valve seat having an elastomer seal. In the second valve chamber having the work connection, a circular control edge is formed on a radial annular shoulder disposed spaced apart from the valve seat; this control edge, together with a control edge encompassing the outside of the piston slide on its end face toward the valve seat, controls the valve opening. This structural provision assures that upon valve closure the valve opening is closed in advance of the seating of the valve member upon the seal, so that the seat valve is pressure-equalized upon valve closure. At the same time, the occurrence of a large volumetric flow at a high flow velocity in the region of the seal, preferably embodied as an elastomer seal, is prevented.

To prevent the elastic seal from being destroyed by a high pressure load in the closing state, a further embodiment of the invention provides a stop structurally connected to the housing, on which stop the valve member, or the control piston rigidly joined to the valve member, is supported in the closing position of the seat valve.

In another embodiment of the invention, two seat valves, each with one valve seat and one valve member, are disposed axially one behind the other; the two valve members are opened synchronously by the control piston. Both valve chambers of the seat valves, each having one supply connection, then communicate with the rear control chamber. This kind of pressure holding valve is preferably used in leveling systems of vehicles having a fully-supporting hydropneumatic suspension, because two work cylinders or actuators have to be supplied per axle. In this pressure holding valve, it is also assured that opening of the pressure holding valve can occur only if the valve chambers of the seat valves have been blocked off from the direction of their supply connections or are supplied with pressure. If the proportional valves typically used to supply pressure or relieve pressure connect the supply connections to a pressure fluid sink, then because of the equalization line with a throttle or check valve, no pressure can build up in the control chamber upstream of the control piston. This avoids sudden, uncontrolled sinking of the vehicle body when the vehicle is put into operation.

In a preferred embodiment of the invention, the pressure holding valve, equipped with two seat valves, is embodied such that n the closing position of the two seat valves the two work connections communicate with one another through a throttle restriction that is blocked off upon opening of the seat valves. This has the advantage that if the leveling system fails, with the associated automatic closure of the pressure holding valve, a pressure equilibrium between the work cylinders or actuators is effected, so that the actuator pressures in whichever actuators are associated with one vehicle axle are not highly different, which would otherwise result in unstable driving conditions.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
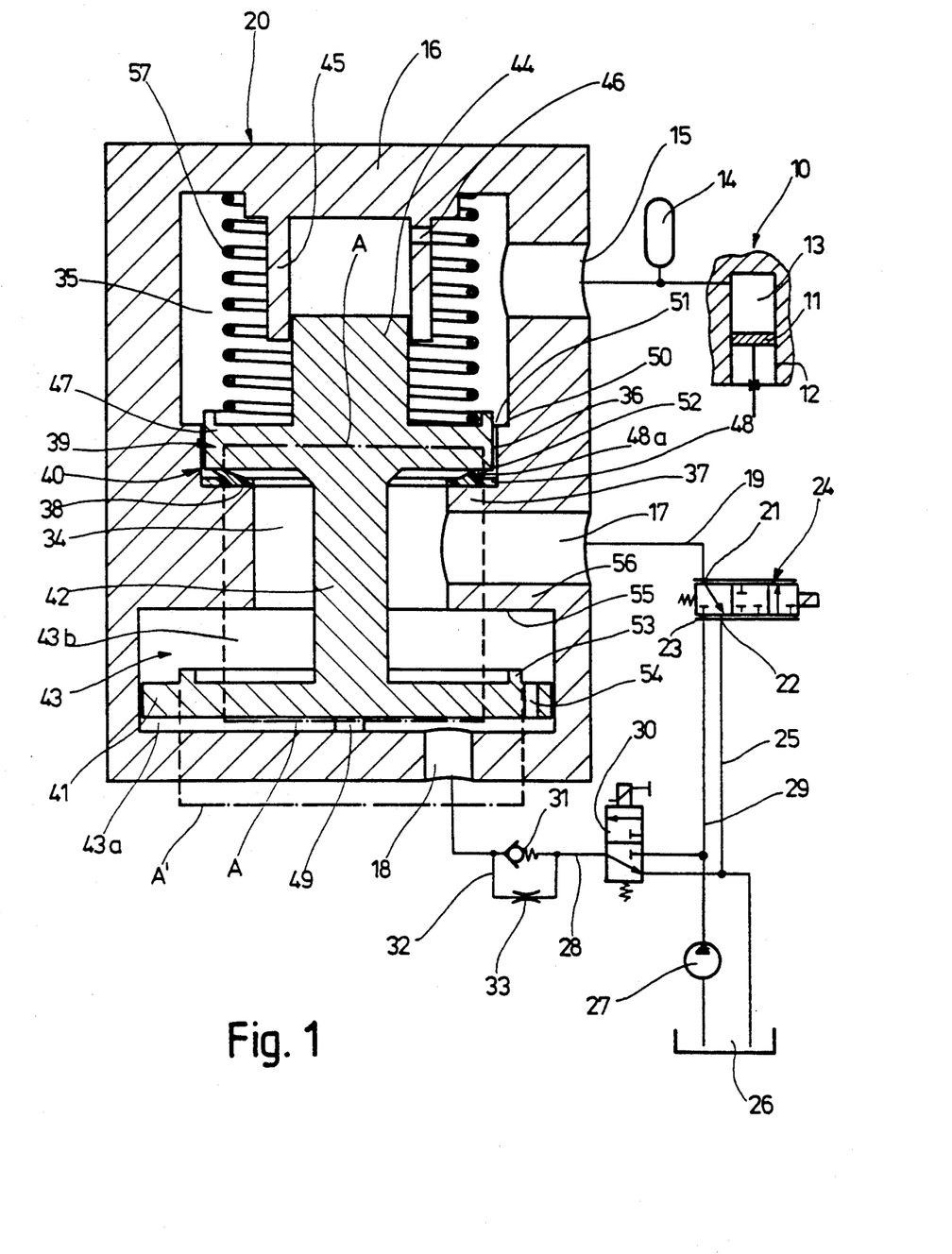
FIG. 1 is a basic circuit diagram of a pressure control apparatus for a hydraulic work cylinder with a pressure holding valve schematically shown in longitudinal section.

The pressure control device shown in a basic circuit diagram in FIG. 1 is used for instance to raise and lower a load; the load may also be the body of a vehicle. The load is secured to a work piston 11 of a hydraulic work cylinder or actuator 10, which is guided axially displaceably in a hydraulic cylinder 12 and with it defines a work chamber 13. The work chamber 13 communicates on the one hand with a pressure reservoir 14 and on the other with a work connection 15 of a pressure holding valve 20, which is accommodated in its valve housing 16. The valve housing 16 also has a supply connection 17 and a control connection 18. The supply connection 17 is connected via a pressure line 19 to a first valve connection 21 of a 3/3-way valve 24 with a proportional magnet and spring restoration, hereinafter called the proportional valve 24. The second valve connection 22 of the proportional valve 24 is connected to a relief line 25 that leads to a tank 26 for hydraulic oil, and the third valve connection 23 communicates with a feed line 29, leading to the outlet of a feed pump 27, that feeds hydraulic oil out of the tank 26. The proportional valve 24 is embodied such that the first valve connection 21, in an uncontrolled (currentless) terminal valve position, communicates with the second valve connection 22 and, in a further terminal position controlled by maximum current communicates with the feed line 29, via the third valve connection 23. In a middle position of the proportional valve 24, all three valve connections 21 to 23 are blocked off. The control connection 18 of the pressure holding valve 20 communicates via a control line 28 with a pilot control valve 30 embodied as a 2/2-way magnet valve. The pilot control valve 30 is embodied such that in its uncontrolled (currentless) basic position, it connects the control line 28 with the relief line 25 position (when it is supplied with electrical current) it connects the control line 28 with the feed line 29. A check valve 31 with an open direction toward the pilot control valve 30 and a bypass 32 around the check valve 31, with a throttle 33 located in the bypass, are disposed in the control line 28.

A first valve chamber 34 and a second valve chamber 35 are embodied in the valve housing 16 and communicate with one another via a valve opening 36. The supply connection 17 discharges into the first valve chamber 34, and the work connection 15 discharges into the second valve chamber 35. A valve seat 38 that cooperates with a valve member 39 is embodied on a housing shoulder 37 protruding into the first valve chamber 34. The valve seat 38 and the valve member 39 together form a seat valve 40, which can be driven in the opening direction by a control piston 41. Like the valve member 39, the control piston 41 is preferably integrally embodied on a control slide 42, which is axially displaceably guided in the valve housing 16. The control piston 41 is located in a control chamber 43 embodied in the valve housing 16 and divides it into a forward control chamber 43a, into which the control connection 18 discharges, and a rear control chamber 43b, which communicates with the first valve chamber 34. On its end remote from the control piston 41, the control slide 42 has a guide piston 44, which plunges into a guide neck 45 protruding coaxially into the second control chamber 35 from the valve housing 16 and is axially displaceably guided in that neck. Near the bottom of the guide neck 45 at least one radial bore 46 pierces the cylindrical wall of the guide neck 45. If this bore 46 is embodied as a throttle, then the guide piston 44 and the guide neck 45 can be utilized to damp the displacement motion of the control slide 42.

The valve member 39 of the seat valve 40 is embodied as a piston slide 47, which rests with its end face on the valve seat 38, via an elastomer seal 48 disposed on the valve seat 38. The seal 48 presses against the end face of the piston slide 47 with a sealing lip 48a. To avoid an overly heavy pressure load on the seal 48, the control slide 42 is supported on the valve housing 16 via a stop cam 49. In the exemplary embodiment, the stop cam 49 is disposed centrally on the piston face of the control piston defining the forward control chamber 43a. Spaced apart from the valve seat 38, viewed in the opening direction of the piston slide 47, there is a receding radial annular shoulder 50 formed on the valve housing 16; its forward edge, toward the piston slide 47, forms a circular control edge 51. This control edge 51 cooperates with a control edge 52, encompassing the outside of the piston slide 47 on its end face toward the valve seat 38, for opening and closing the valve opening 36 of the seat valve 40. As soon as the control edge 52 overtakes the control edge 51 in the opening direction, the valve opening 36 is uncovered. If the control edge 52 overtakes the control edge 51 in the closing direction, then the valve opening 36 is closed again except for a small flow of leaking oil via the rim of the piston slide; accordingly, this closure takes place in advance of the seating of the piston slide 47 on the seal 48.

The outside diameter of the control piston 41 is dimensioned to be greater than the diameter of contact of the piston slide 47 on the valve seat 38 or on the seal 48. An annular rib 53 is disposed on the face of the control piston 41 defining the rear control chamber 43b; the outside diameter of this rib is greater than the contact diameter of the piston slide 47 on the seal 48. Outside this annular rib 53, a fully continuous throttle bore 54 is made in the control piston 41; this bore, as an equalization line, connects the forward and rear control chambers 43a, 43b with one another. The cross section of this throttle bore 54 is dimensioned as smaller than the throttle cross section of the throttle 33 in the bypass 3 in the control line 28. At the end of the maximum displacement stroke of the control slide 42, the annular rib 53 is seated upon an annular face 55, defining the rear control chamber 43b, of a radially protruding housing shoulder 56 of the valve housing 16, thereby disconnecting the throttle bore 54 from the rear control chamber 43b. The displacement motion of the control slide 42 is effected counter to a valve closing spring 57, disposed in the second valve chamber 35 and support at one end on the piston slide 47 and at the other on the valve housing 16. The initial tension force of the valve closing spring 57 effected in the direction of the seat valve 40 is designed to be extremely low.

The mode of operation of the pressure control apparatus is as follows:

To increase or decrease the pressure in the work chamber 13 of the actuator 10, the proportional valve 24 is moved into its middle blocking position or is moved slightly in the direction of pressure delivery. At the same time, the pilot control valve 30 is reversed, so that the control line 28 communicates with the feed line 29. Hydraulic oil flows into the forward control chamber 43a via the throttle 33 in the control line 28, and pressure builds up via the throttle bore 54 in the rear control chamber 43b and in the first valve chamber 34 that communicates with it and is blocked off by the proportional valve 24. Once the pressure $p_1$ in the forward control chamber 43 has risen far enough that the condition $$p_1 \cdot A \geqq p_2 \cdot A + F_{57} \tag{1}$$

is fulfilled, in other words that the left-hand term of equation (1) is slightly larger than the right-hand term, the control valve 40 begins to open. The symbol $p_2$ is the pressure in the second valve chamber 35, and A is the effective pressure impingement face at the piston slide 4 and at the control piston 41, this face being defined by the dot-dashed outline in FIG. 1. $F_{57}$ is the spring force of the valve closing spring 57, which —as described — is dimensioned as quite low. At the instant the seat valve 40 opens, the pressure difference $$\Delta p = p_1 - p_2 = F_{57}/A \tag{2}$$

thus prevails at the elastic seal 48. Since the spring force $F_{57}$ is quite low, the pressure difference $\Delta p$ is likewise quite low. This only slight pressure difference contributes to protecting the seal 48, and in particular the sealing lip 48a.

As soon as the piston slide 47, with its control edge 52, overtakes the control edge 51 on the valve housing 16, hydraulic oil can flow via the control edges 51, 52. The pressure $p_2$ is then established in the first valve chamber 34. Since the pressure $p_1$ in the forward control chamber 43a is somewhat greater than the pressure $p_2$ in the two valve chambers 34, 35, the control slide 42 continues to move until the annular rib 53 strikes the bottom of the rear control chamber 43b on the valve housing 16. As a result, the effective pressure impingement face of the control piston 41 increases in size from A to A', as shown in dot-dashed lines in FIG. 1. The control slide 42 is retained in the terminal opening position of the seat valve 40, and the throttle bore 54 is blocked off. By suitable reversal of the proportional valve 24 into one or the other terminal position, the pressure in the work chamber 13 of the actuator 10 can now be increased or reduced.

Figure 2:
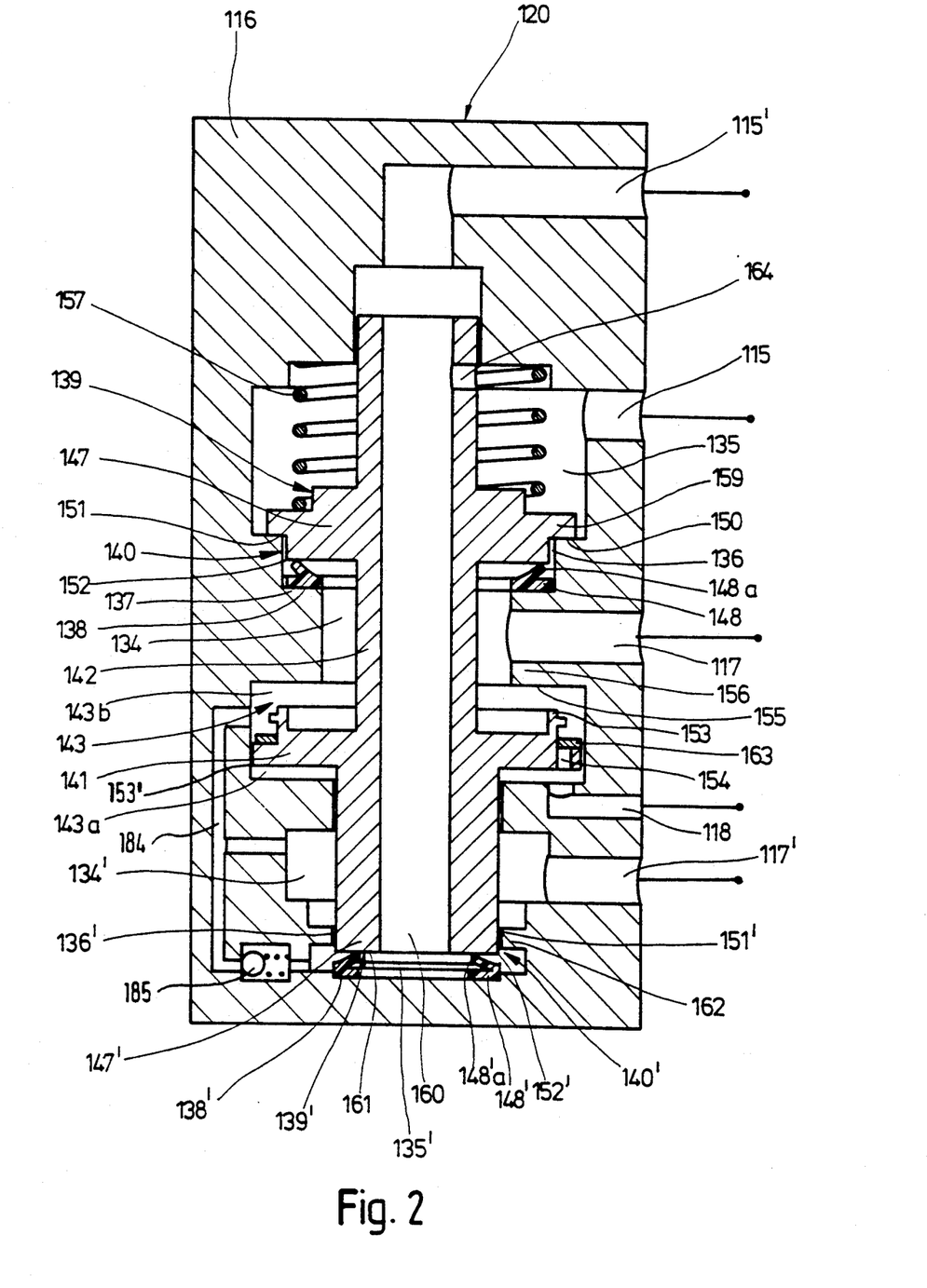
FIG. 2 is a schematic longitudinal section through a pressure holding valve for a vehicle leveling system.

A pressure holding valve 120, of the kind used for a leveling system of vehicles having a fully supporting hydropneumatic suspension, in which two actuators must be supplied per vehicle axle, is shown schematically in longitudinal section in FIG. 2. While the hydraulic cylinders of the actuators are each secured to a wheel suspension or to the axle, the work pistons are pivotably connected to the left and right side of the vehicle body, respectively. The pressure holding valve 120 is largely equivalent to the pressure holding valve 20 of FIG. 1 in terms of its structure and mode of operation, and so identical components are provided with the same reference numerals, but raised by 100 in order to distinguish them.

Unlike the pressure holding valve 20 of FIG. 1, the pressure holding valve 120 of FIG. 2 has two seat valves 140, 140', disposed axially one behind the other in the housing 116, which each comprise one valve seat 138 and 138' and one valve member 139 and 139', respectively; once again, there is one seal each 148 and 148', preferably an elastomer seal 148', disposed on the respective valve seats 138 and 138'; in the closing state of the applicable seat valve 140 or 140', the seal presses with a sealing lip 148a or 148'a against the valve member 139 or 139'. To relieve the pressure on the seals 148, 148' in the closing state of the applicable seat valve 140 or 140', the valve member 139, again embodied as a piston slide 147, of the seat valve 140 strikes the annular shoulder 150 preceding the valve opening 138 of the seat valve 140 with a radially protruding annular flange 149. The two valve members 139, 139' are actuated in common by one control piston 141 and together with it are integrally embodied on a control slide 142, which has a longitudinally continuous central bore 160. As already mentioned, the valve member 139 is embodied as a flange-like piston slide 147 on the piston slide 142, which by means of a control edge 152 cooperates with the control edge 151 formed on the annular housing shoulder 150 to open and close the valve opening 136 of the seat valve 140. The other valve member 139, likewise embodied as a piston slide 147', is formed by the end of the control slide 142, which is seated with its annular end face 161 on the seal 148. For blocking and uncovering the valve opening 136, the control edge 152' extending on the outside of the end face 161 cooperates with the control edge 151' embodied on a radially protruding annular rib 162 of the housing 116.

Each valve opening 136 and 136' connects a first valve chamber 134 and 134', respectively, with a second valve chamber 135 and 135'. A respective supply connection 117 and 117' discharges into each of the first valve chambers 134, 134', while a respective work connection 115 and 115' discharges into each of the second valve chambers 135, 135'. The first valve chambers 134, 134' communicate with the rear control chamber 143b of the control chamber 143, in which the control piston 141 is again axially displaceably guided. The control connection 118 again discharges into the forward control chamber 143a. The control connection 118 is configured like the control connection 18 of FIG. 1. Once again, as in FIG. 1, the supply connections 117, 117' communicate with a respective proportional valve. One actuator is connected to each of the work connections 115, 115', again as in FIG. 1.

To attain a predominant pressure equalization of the seals 148, 148' of the seat valves 140, 140' upon opening of the pressure holding valve 120, the equalization line is again provided in the control piston 141, in the form of an axially longitudinally continuous bore 154, which together with a sealing ring forms a check valve 163 acting as a flutter valve, the open direction of which is toward the rear control chamber 143b. In the opening terminal position of the pressure holding valve 120, this check valve is closed, on the control piston face defining the rear control chamber 143b, by the annular rib 153b, which presses against the annular face 155 of the housing shoulder 156.

There is a connection 184 in the valve housing 116. It leads from the control chamber 143b into the first valve chamber 134' and to the side of the seal 148' remote from the second valve chamber 135'. When the control slide 142 is actuated upward, a further annular rib 153', provided on the control piston 141, blocks the mouth of the connection 184 into the control chamber 143b.

In order that upon closure of the seat valve 140', that is, once the control edge 152' comes to coincide with the control edge 151', the pressure fluid will be unable to flow out of the region of the seal 148' through the connection 184 into the first valve chamber 134', a check valve 185 that prevents this undesired possibility is disposed in the connection 184.

The seat valve 140' is equivalent in function to the seat valve 140.

At least one throttle bore 164 discharging into the central bore 160 is disposed in the bore wall of the control slide 142 in such a way that in the closing position of the pressure holding valve 120, the throttle bore is open toward the second valve chamber 135 of the seat valve 140 and is closed b the valve housing 116 upon the onset of the displacement motion of the control slide 142. Since the central bore 160 establishes the communication with the second valve chamber 135' of the seat valve 140' and the associated work connection 115', the two second valve chambers 135, 135' of the two seat valves 140, 140' communicate with one another in the valve closing position of the pressure holding valve 120, and thus the two work chambers 115 and 115' likewise communicate with one another at that time. Accordingly, this throttle bore 164 enables a pressure equalization between the actuators in the closing position of the pressure holding valve 120, so that in the event the leveling system should fail, for instance from a sudden loss of current to the pilot control valve 30 in FIG. 1, unstable driving conditions from extremely different pressures in the two actuators will not arise. With the control slide 142 actuated upward, or in other words in the normal operating position, the throttle bore 164 is closed, and the two actuators are actuatable independently of one another.

The mode of operation of the pressure holding valve 120 of FIG. 2 is identical to that of the pressure holding valve 20 in FIG. 1, and so reference is made to the description of that valve. The two seat valves 140 and 140' are opened and closed in synchronism, and the same pressure and flow conditions arise at the two seat valves 140 and 140'. It should be noted that the pressure holding valve 120 cannot be opened as long as the two supply connections 117 and 117' have not been closed off by the proportional valve or acted upon by pressure, because as a consequence of the communication between the supply connections 117 and 117' and the pressure fluid sink, that is, the tank 26 in FIG. 1, no control pressure for displacing the control piston 141 can build up in the forward control chamber 143a.

In the exemplary embodiment shown in FIG. 1 as well, a check valve corresponding to the check valve 163 (FIG. 2) can be disposed in the throttle bore 54, or depending on the application, the throttle bore 154 may optionally be embodied without the check valve 163 in the exemplary embodiment of FIG. 2.

Figure 3:
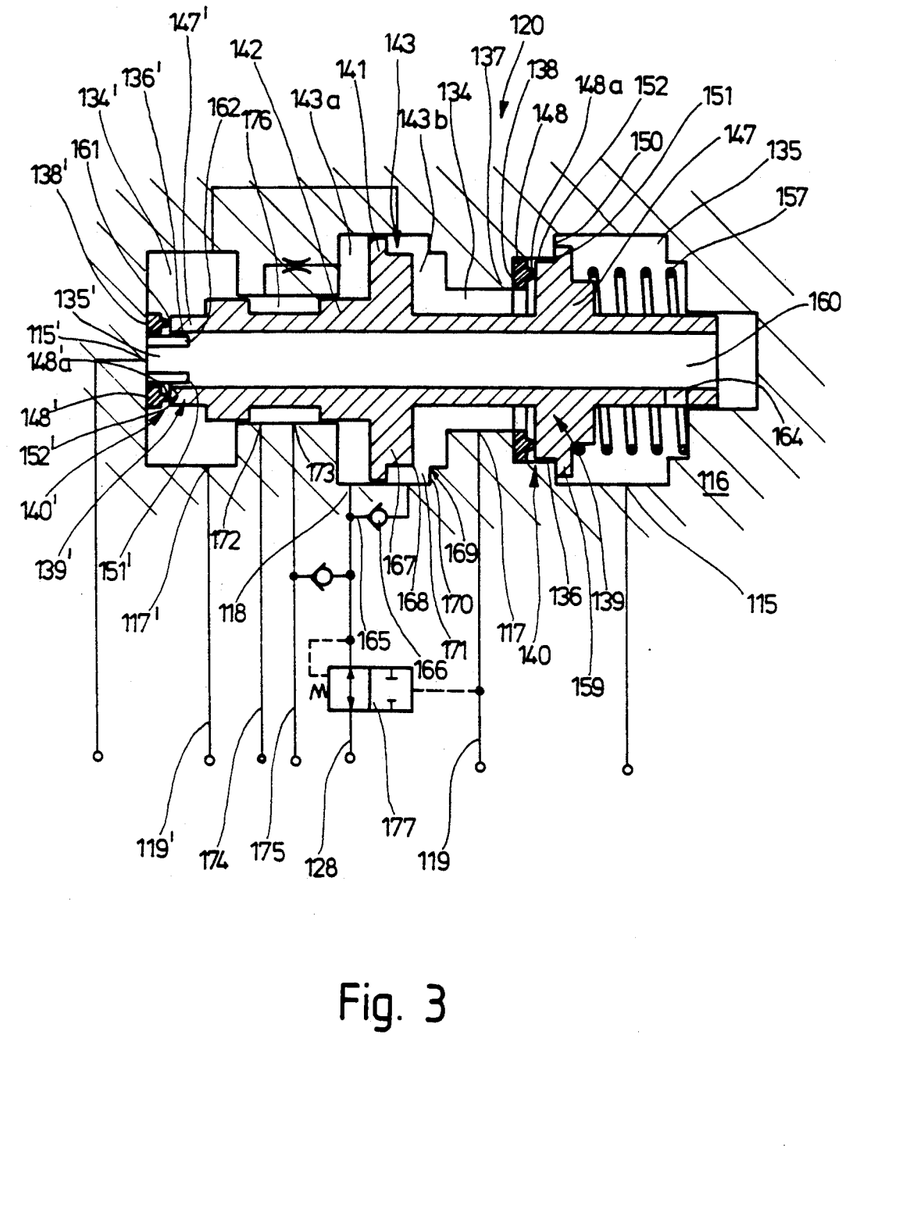
FIG. 3 is the same view as in FIG. 2, in connection with a further exemplary embodiment.

FIG. 3 shows a further exemplary embodiment of the pressure holding valve 120 in longitudinal section and schematically; this valve has been modified somewhat compared with the pressure holding valve 120 of FIG. 2. To the extent that components of FIG. 3 match those of FIGS. 2, they are identified by the same reference numerals.

A first modification is that the bore 154, visible in FIG. 2, in the control piston 141 and having the flutter valve 163 has been eliminated. Its function as an equalization line between the forward and rear control chambers 143a, 143b is taken on here by a connecting line 165 that connects the control line 128 with the rear control chamber 143b and by a check valve 166, disposed in the connecting line 165 and having an open direction toward the rear control chamber 143b. The mouth of the connecting line 165 into the rear control chamber 143b is again closed off, in the terminal opening position of the pressure holding valve 120, by the control piston 141; for that purpose, this control piston has a piston segment 167 located in the rear control chamber 143 and having a reduced diameter; a circular control edge 168 is formed on its free end face. This control edge 168 cooperates with a further control edge 169, which is formed on a radially protruding housing shoulder 170, the inside diameter of which shoulder is dimensioned to be slightly larger than the diameter of the piston segment 167. The mouth of the connecting line 165 is located near the housing shoulder 170. In the terminal opening position of the pressure holding valve 120, the two control edges 168, 169 partition an annular chamber 171, in Which the mouth of the connecting line 165 is located, from the rear control chamber 143b, so that this rear control chamber is blocked off.

The pressure holding valve 120 also has two further controlled valve connections 172 and 173, and thus represents a hydraulically actuated 6/2-position seat valve, with six controlled connections and two valve positions. The valve connection 172 communicates with a return line 174 having an integrated throttle and leading to the tank 26 in FIG. 1, and the valve connection 173 communicates with an outgoing control line 175, at which a hydraulic control signal can be picked up whenever the pressure holding valve 120 is fully opened. An annular groove 176 provided in the control slide 142 is disposed such that in the closing position of the pressure holding valve 120, it covers both valve connections 172 and 173, and in the opening position of the pressure holding valve 120, it connects the forward control chamber 143a with the valve connection 173. Control pressure from the forward control chamber 143a thus reaches the control line 15 and can be used to trip some other control operation. Leaking oil is carried away from the forward control chamber 143a via the return line 174, so that if the control line 128 is blocked, the pressure holding valve 120 cannot open over the course of time as a result of a flow of leaking oil from the rear control chamber 143b into the forward control chamber 143a.

A 2/2-way valve 177 with spring restoration is also provided in the control line 128; its hydraulic control connection is connected to one of the pressure lines 119 or 119' leading to the respective supply connections 117, 117'. The 2/2-way valve 177 is open in its basic position and blocked in its reversed work position. This assures that if there is pressure fluid pressure in one of the pressure lines 119, 119', blockage of the control line 128 takes place, thereby preventing a buildup of pressure in the forward control chamber 143a for opening the pressure holding valve 120. This assures that the pressure holding valve will open only whenever both supply connections 117, 117' are blocked, or in other words whenever the proportional valves are not in one or the other of their opening positions. Sudden uncontrolled motions of the vehicle body when the vehicle is put into operation are avoided thereby. The 2/2-way valve 177 can be omitted if the pressure impingement faces on the control piston 141 and control slide 147 are dimensioned appropriately.

The pressure holding valve 20, 120 described above may also be used in unaltered form in pneumatic pressure control apparatuses, for maintaining a set pressure in at least one work cylinder actuated with compressed air.

In the three exemplary embodiments shown, the seal 48, 148, 148' is a lip seal, pressed against or glued or vulcanized onto the valve seat 38, 138, 138', of elastic, preferably soft-elastic material. The seal 48, 148, 148' may equally well be secured to the valve member 39, 139, 139'; in that case, the seal 48, 148, 148' rests on the valve seat 38, 138, 138' in the closed position of the pressure holding valve 20, 120. The seal 48, 148, 148' may also be inserted part way into a groove provided on the valve seat 38, 138, 138' or on the valve member 39, 139, 139'. The seal may be embodied as a circumferentially continuous seal with a round cross section, in other words as an 0-ring. The term "soft-elastic seal" is understood here to include any seals made of rubber or elastically deformable plastic.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure holding valve for pressure-fluid-actuated leveling systems in vehicles, having at least one seat valve that has a valve opening connecting first and second valve chambers to one another, of which the first valve chamber communicates with a supply connection connectable in alternation to a pressure fluid source or a pressure fluid sink and the second valve chamber communicates with a work connection, said second valve chamber has a valve seat and a valve member cooperating with the valve seat and acted upon in an opposite direction by the pressure in the two valve chambers, and having a control piston for opening the at least one seat valve, the control piston engaging the valve member and being capable of being acted upon by pressure fluid via a control line, a seal (48; 148, 148') effecting sealing between the valve seat (38; 138, 138') and the valve member (39; 139, 139'); pressure equalization means (54; 154, 163; 165, 166) which upon pressure imposition on the control piston (41; 141) builds up a pressure in the first valve chamber (34; 134, 134') such that upon the onset of opening of the seat valve (40; 140, 140') only a slight pressure difference appears at the seal (48; 148, 148'); and that the valve member (39; 139, 139') is embodied such that upon displacement in a closing direction of the seat valve (40; 140, 140'), the valve member substantially closes the valve opening (36; 136, 136') in advance of the valve member becoming seated upon the valve seat (38; 138, 138'), and the pressure equalization means has an equalization line (54; 154, 165), in which a throttle (54) is disposed and which connects the control line (28; 128) to the control piston (41; 141) with the first valve chamber (34; 134, 134'), and a blocking device (24) for blocking off the supply connection (17; 117, 117') discharging into the first valve chamber (34; 134, 134'); and that in the terminal opening position of the seat valve (40; 140, 140'), the equalization line (54; 154, 165) is blocked off.

2. A valve as defined by claim 1, in which the control piston (41; 141) connected to the valve member (39; 139, 139') is axially displaceably guided in a control chamber (43; 143) and divides the control chamber into a forward control chamber (43a; 143a), communicating with the control line (28; 128), and a rear control chamber (43b; 143b), communicating with the first valve chamber (34; 134, 134'); and that the control piston (41; 141) is embodied such that each of two piston faces defining the control chambers (43a, 43b; 143a, 143b) is larger than a face on the valve member (39; 139, 139') enclosed by a contact radius on the valve seat (38; 138, 138').

3. A valve as defined by claim 1, in which the terminal closing position of the seat valve (40; 140, 140') rests on a stop (49, 150) structurally connected to the housing.

4. A valve as defined by claim 1, in which the blocking device for blocking off the first valve chamber (34) is formed by a proportional valve (24) switched over into the blocking position.

5. A valve as defined by claim 1, in which the valve member (39; 139, 139') is embodied as a piston slide (47; 147, 147'), which is seated by one end face on the valve seat (38; 138, 138'), and that a circular control edge (51; 151, 151') is embodied on a radial annular shoulder (50; 150, 162) disposed in the second valve chamber (35; 135, 135') spaced apart from the valve seat (38; 138, 138'), which control edge, together with a control edge (52; 152, 152') encompassing the outside of the piston slide (47; 147, 147') on its piston end face toward the valve seat (38; 138, 138'), controls the valve opening (36; 136, 136').

6. A valve as defined by claim 1, in which a throttle restriction (33) is embodied in the control line (28) to the control piston (41).

7. A valve as defined by claim 1, in which the seal (48, 148, 148') comprises an elastic material.

8. A valve as defined by claim 7, in which the seal (48, 148, 148') is joined to the valve seat (38, 138, 138').

9. A valve as defined by claim 7, in which the seal (48, 148, 148') is joined to the valve member (39, 139, 139').

10. A valve as defined in claim 1, in which the terminal closing position of the valve member (39; 139) rests on a stop (49, 150) structurally connected to the housing.

11. A valve as defined by claim 1, in which the terminal closing position of the control piston (41; 141) rests on a stop (49, 150) structurally connected to the housing.

12. A pressure holding valve for pressure-fluid-actuated leveling systems in vehicles, having at least one seat valve that has a valve opening connecting first and second valve chambers to one another, of which the first valve chamber communicates with a supply connection connectable in alternation to a pressure fluid source or a pressure fluid sink and the second valve chamber communicates with a work connection, said second valve chamber has a valve seat and a valve member cooperating with the valve seat and acted upon in an opposite direction by the pressure in the two valve chambers, and having a control piston for opening the at least one seat valve, the control piston engaging the valve member and being capable of being acted upon by pressure fluid via a control line, a seal (48; 148, 148') effecting sealing between the valve seat (38; 138, 138') and the valve member (39; 139, 139'); pressure equalization means (54; 154, 163; 165, 166) which upon pressure imposition on the control piston (41; 141) builds up a pressure in the first valve chamber (34; 134, 134') such that upon the onset of opening of the seat valve (40; 140, 140') only a slight pressure difference appears at the seal (48; 148, 148'); and that the valve member (39; 139, 139') is embodied such that upon displacement in a closing direction of the seat valve (40; 140, 140'), the valve member substantially closes the valve opening (36; 136, 136') in advance of the valve member becoming seated upon the valve seat (38; 138, 138'), and the pressure equalization means has an equalization line (54; 154, 165), in which a check valve (163; 166) is disposed and which connects the control line (28; 128) to the control piston (41; 141) with the first valve chamber (34; 134, 134'), and a blocking device (24) for blocking off the supply connection (17; 117, 117') discharging into the first valve chamber (34; 134, 134'); and that in the terminal opening position of the seat valve (40; 140, 140'), the equalization line (54, 154; 165) is blocked off.

13. A pressure holding valve for pressure-fluid-actuated leveling systems in vehicles, having at least one seat valve that has a valve opening connecting first and second valve chambers to one another, of which the first valve chamber communicates with a supply connection connectable in alternation to a pressure fluid source or a pressure fluid sink and the second valve chamber communicates with a work connection, said second valve chamber has a valve seat and a valve member cooperating with the valve seat and acted upon in an opposite direction by the pressure in the two valve chambers, and having a control piston for opening the at least one seat valve, the control piston engaging the valve member and being capable of being acted upon by pressure fluid via a control line, a seal (48; 148, 148') effecting sealing between the valve seat (38; 138, 138') and the valve member (39; 139, 139'); pressure equalization means (54; 154, 163; 165, 166) which upon pressure imposition on the control piston (41; 141) builds up a pressure in the first valve chamber (34; 134, 134') such that upon the onset of opening of the seat valve (40; 140, 140') only a slight pressure difference appears at the seal (48; 148, 148'); and that the valve member (39; 139, 139') is embodied such that upon displacement in a closing direction of the seat valve (40; 140, 140'), the valve member substantially closes the valve opening (36; 136, 136') in advance of the valve member becoming seated upon the valve seat (38; 138, 138'), and the control piston (41; 141) connected to the valve member (39; 139, 139') is axially displaceably guided in a control chamber (43; 143) and divides the control chamber into a forward control chamber (43a; 143a), communicating with the control line (28; 128), and a rear control chamber (43b; 143b), communicating with the first valve chamber (34; 134, 134'); and that the control piston (41; 141) is embodied such that each of two piston faces defining the control chambers (43a, 43b; 143a, 143b) is larger than a face on the valve member (39; 139, 139') enclosed by a contact radius on the valve seat (38; 138, 138').

14. A valve as defined by claim 13, in which the valve member (39; 139, 139') is acted upon by a valve closing spring (57; 157) having an extremely low initial tension in the closing direction.

15. A valve as defined by claim 13, in which the equalization line between the control line (28) and the first valve chamber (34) is embodied as a bore (54; 154) in the control piston (41; 141).

16. A valve as defined by claim 14, in which the equalization line between the control line (28) and the first valve chamber (34) is embodied as a bore (54; 154) in the control piston (41; 141).

17. A valve as defined by claim 13, in which the equalization line between the control line (128) and the first valve chamber (134) is embodied as a connecting line (165) discharging into the rear control chamber (143b).

18. A valve as defined by claim 14, in which the equalization line between the control line (128) and the first valve chamber (134) is embodied as a connecting line (165) discharging into the rear control chamber (143b).

19. A valve as defined by claim 15, in which the control piston (41; 141), on the piston face defining the rear control chamber (43b; 143b), has an encompassing control edge that together with a further control edge embodied in the rear control chamber (43b; 143b), in the terminal opening position of the seat valve (40; 140), disconnects the mouth of the equalization line (54; 154; 165) from the rear control chamber (43b; 143b).

20. A valve as defined by claim 17, in which the control piston (41; 141), on the piston face defining the rear control chamber (43b; 143b), has an encompassing control edge that together with a further control edge embodied in the rear control chamber (43b; 143b), in the terminal opening position of the seat valve (40; 140), disconnects the mouth of the equalization line (54; 154; 165) from the rear control chamber (43b; 143b).

21. A valve as defined by claim 15, in which the control edge on the control piston (41; 141) is embodied on an annular rib (53; 153), axially protruding from the piston face, which rib, in the terminal opening position of the seat valve (40; 140), is seated on a housing shoulder (37; 137) radially protruding into the rear control chamber (43b; 143b), and that the bore (54; 154) is made in a piston region located between the annular rib (53; 153) and the edge of the control piston.

22. A valve as defined by claim 19, in which the control edge on the control piston (41; 141) is embodied on an annular rib (53; 153), axially protruding from the piston face, which rib, in the terminal opening position of the seat valve (40; 140), is seated on a housing shoulder (37; 137) radially protruding into the rear control chamber (43b; 143b), and that the bore (54; 154) is made in a piston region located between the annular rib (53; 153) and the edge of the control piston.

23. A valve as defined by claim 21, in which the inside diameter of the annular rib (53; 153) is larger than the contact diameter of the valve member (39; 139, 139) on the valve seat (38; 138, 138').

24. A valve as defined by claim 17, in which the control edge (168) on the control piston (141) is embodied on a protruding piston segment (167) of reduced diameter, and the control edge (169) in the rear control chamber (143b) is embodied on a radially protruding housing shoulder (170), the inside diameter of which is slightly larger than the diameter of the piston segment (167), and that the mouth of the connecting line (165) in the rear control chamber (143b) is disposed with a radial mouth axis near the housing shoulder (170), and spaced apart from it by a distance that is shorter than the axial length of the piston segment (167) of reduced diameter.

25. A valve as defined by claim 19, in which the control edge (168) on the control piston (141) is embodied on a protruding piston segment (167) of reduced diameter, and the control edge (169) in the rear control chamber (143b) is embodied on a radially protruding housing shoulder (170), the inside diameter of which is slightly larger than the diameter of the piston segment (167), and that the mouth of the connecting line (165) in the rear control chamber (143b) is disposed with a radial mouth axis near the housing shoulder (170), and spaced apart from it by a distance that is shorter than the axial length of the piston segment (167) of reduced diameter.

26. A valve as defined by claim 13, in which first and second seat valves (140, 140'), each with one valve seat (18, 138') and two valve member (139, 139'), are disposed axially one after the other; that the control piston (141) is connected to both valve members (139, 139') for synchronous opening of the first and second seat valves (140, 140'), and that both first valve chambers (134, 134') of the first and second seat valves (140, 140') communicate with the rear control chamber (143b) of the control chamber (143) receiving the control piston (141).

27. A valve as defined by claim 21, in which two second valve chambers (135, 135') of the first and second seat valves (140, 140'), in their closing position, communicate with one another through a throttle restriction (164).

28. A valve as defined by claim 26, in which control piston (141) and the two valve members (139, 139') embodied as piston slides (147, 147') are combined into a piston unit (142); that the piston unit (142) has a bore (160) that communicates directly with one second valve chamber (135') and communicates with the other second valve chamber (135) via a radial throttle bore (164); and that the throttle bore (164) is disposed spatially in such a manner that it is closed by an axial displacement of the piston unit (142) prior to the opening of the two valve openings (136, 136').

* * * * *